United States Patent
Yochai et al.

(10) Patent No.: US 8,705,538 B1
(45) Date of Patent: Apr. 22, 2014

(54) METHODS AND SYSTEMS FOR DYNAMIC DIVISION OF PATH CAPACITY

(75) Inventors: Yechiel Yochai, Lincoln, RI (US); Helen Raizen, Jamaica Plain, MA (US); Harold M. Sandstrom, Belmont, MA (US); Edith Epstein, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 422 days.

(21) Appl. No.: 13/096,397

(22) Filed: Apr. 28, 2011

Related U.S. Application Data

(63) Continuation of application No. 11/682,049, filed on Mar. 5, 2007, now Pat. No. 7,957,398.

(51) Int. Cl.
*H04L 12/28* (2006.01)

(52) U.S. Cl.
USPC .................................................... 370/395.42

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | |
|---|---|---|---|
| 5,995,511 A * | 11/1999 | Zhou et al. ..................... 370/412 |
| 6,145,028 A * | 11/2000 | Shank et al. ..................... 710/31 |
| 6,230,229 B1 * | 5/2001 | Van Krevelen et al. ........ 710/317 |
| 6,434,637 B1 * | 8/2002 | D'Errico ........................... 710/38 |
| 6,542,944 B2 | 4/2003 | D'Errico |
| 6,542,994 B1 * | 4/2003 | Dircks et al. ..................... 726/19 |
| 6,973,529 B2 * | 12/2005 | Casper et al. ................... 710/316 |
| 7,032,041 B2 * | 4/2006 | Sahara et al. ..................... 710/38 |
| 7,120,912 B2 * | 10/2006 | Kadoiri et al. ................. 718/104 |
| 7,130,928 B2 * | 10/2006 | Hayashi et al. ..................... 710/8 |
| 7,240,135 B2 * | 7/2007 | Bai et al. ......................... 710/244 |
| 7,337,235 B2 * | 2/2008 | Allen et al. ..................... 709/239 |
| 7,558,916 B2 * | 7/2009 | Chikusa et al. ................ 711/114 |
| 7,568,052 B1 * | 7/2009 | Cwiakala et al. .................. 710/8 |
| 2002/0166005 A1 * | 11/2002 | Errico .............................. 710/38 |
| 2003/0065871 A1 * | 4/2003 | Casper et al. ................... 710/316 |
| 2003/0177290 A1 * | 9/2003 | Ayukawa et al. ................ 710/10 |
| 2004/0042489 A1 * | 3/2004 | Messick et al. ................ 370/468 |
| 2005/0076154 A1 * | 4/2005 | Chambliss et al. ................ 710/1 |
| 2005/0114286 A1 * | 5/2005 | Bai et al. ............................ 707/1 |
| 2005/0144332 A1 * | 6/2005 | Nellitheertha ................... 710/15 |
| 2005/0283552 A1 * | 12/2005 | Kobashi et al. ................ 710/114 |

(Continued)

OTHER PUBLICATIONS

Notice of Allowance dated Apr. 19, 2011, U.S. Appl. No. 11/682,049, filed Mar. 5, 2007, 7 pages.

*Primary Examiner* — Jung-Jen Liu
(74) *Attorney, Agent, or Firm* — Daly, Crowley, Mofford & Durkee, LLP

(57) ABSTRACT

Methods and systems are disclosed that relate to selecting a path for sending an I/O request from a host to a data storage subsystem from among a plurality of paths from the host to the subsystem. An exemplary method includes identifying a limitation on the traffic level for the plurality of paths, tracking a first metric corresponding to the limitation on the traffic level for each path, and transmitting a first I/O request having an urgency level other than the highest urgency level by one of the plurality of paths whose first metric does not exceed its limitation on the traffic level.

20 Claims, 4 Drawing Sheets

(56) References Cited

U.S. PATENT DOCUMENTS

| | | | |
|---|---|---|---|
| 2006/0095686 A1* | 5/2006 | Miller et al. | 711/151 |
| 2007/0168569 A1* | 7/2007 | Bonwick et al. | 710/5 |
| 2008/0162735 A1* | 7/2008 | Voigt et al. | 710/6 |
| 2008/0250178 A1* | 10/2008 | Haustein et al. | 710/107 |
| 2009/0049217 A1* | 2/2009 | Shimada | 710/117 |

* cited by examiner

METHODS AND SYSTEMS FOR DYNAMIC DIVISION OF PATH CAPACITY

CROSS-REFERENCE TO RELATED APPLICATIONS

This application claims priority to and is a continuation of U.S. patent application Ser. No. 11/682,049 filed on Mar. 5, 2007 now U.S. Pat. No. 7,957,398, entitled: METHODS AND SYSTEMS FOR DYNAMIC DIVISION OF PATH CAPACITY, which is incorporated herein by reference in its entirety.

BACKGROUND

In many computer systems using external data storage subsystems, there are multiple physical paths, or buses, to each data storage subsystem. One reason for having multiple paths is to provide redundancy in the case of a failed path. The selection of a path for sending an I/O request can affect the quality of service for applications initiating I/O requests because paths have limited capacity for carrying data. Path capacity limitations may be the result of multiple influences, such as the fundamental bandwidth limitation of the physical connection or the storage subsystem's front-end resources for processing requests. An I/O request that cannot be sent immediately due to path capacity limitations may be queued on the host, and the response time for a queued I/O request may increase accordingly.

One known path allocation strategy is the allocation of all available paths for the transmission of any I/O requests and their associated responses. This strategy maximizes the use of the capacity of the available paths. However, some I/O requests may be more sensitive to response time and such a path allocation strategy may result in slower response times than desirable for those I/O requests. An I/O request may be sensitive to response time, and a user may designate such a request as "high priority", for various reasons including the importance of the application initiating the I/O request or due to the type of I/O used by the application (i.e. synchronized I/O requests may be higher priority than unsynchronized I/O requests).

To accommodate high priority I/O requests, some prior art computer systems allocate at least one path for the transmission of high priority I/O requests to a data storage subsystem and responses thereto. In these systems, other paths are allocated for the transmission of the remaining data traffic. In a database application, for example, redo log write requests may be designated as high priority I/O requests in comparison with data write requests, and a path to the data storage subsystem may be allocated for the transmission of redo log write requests and responses thereto. If redo log write requests do not have a dedicated path to the data storage system, the response time for those requests may be longer than desirable.

Slow responses to redo log write requests transmitted via general purpose paths may be especially evident in database applications where data write requests are aggregated on the host and then sent to the data storage subsystem in a burst. When a burst of I/O is sent, the response time for a redo log request can suffer due to the volume of data write I/O requests being sent on the general purpose paths which have limited capacity.

Another known path allocation strategy is the allocation of one or more paths for I/O requests directed to one or more particular logical units (LUNs) where the response times for such requests are important. Nonetheless, in some systems there is a limited number of paths and assigning a dedicated path may not be possible. Even in systems that have many paths, dedicating one or more paths for the transmission of high priority requests may lead to a higher response time than desirable for lower priority requests. One reason for higher response times for lower priority requests is that the system cannot use the transmission capacity of the dedicated paths even when there are no high priority requests to be sent from the host.

Other prior art strategies, such as Network QoS control programs, run on network switches or routers such as CISCO routers and allow portions of paths to be dedicated for each application. However, Network QoS control programs do not take into account the limitations of the storage-subsystem for handling I/O requests and the capacity is statically allocated for each application without regard to the actual open I/O requests.

SUMMARY OF EXEMPLARY EMBODIMENTS

The inventors of the present invention recognized that known path allocation may not efficiently divide path capacity. The inventors of the present invention recognized that known path allocation strategies may not provide optimal system performance in all circumstances. The inventors of the present invention recognized that path capacity could be logically allocated. The inventors of the present invention recognized that a dynamic path capacity allocation strategy may improve performance for critical applications. The inventors of the present invention further recognized that path capacity and the storage subsystem resources associated with the path could be allocated based on available metrics.

Methods and systems are disclosed that relate to selecting a path by which to send an I/O request from a host to an associated storage subsystem from among a plurality of paths from the host to the associated storage subsystem. An exemplary method consistent with the principles of the invention includes identifying, for each of the plurality of paths, a first limitation on a traffic level for I/O requests having a first urgency level. The first urgency level is not the highest urgency level. The method further includes tracking a first metric corresponding to the first limitation for each of the plurality of paths and identifying a first set of paths whose first metric does not exceed its first limitation. The method further includes transmitting a first I/O request having the first urgency level by one of the first set of identified paths. In some implementations, the first set may often include only one path.

Another exemplary method consistent with the principles of the invention may further include identifying a path among the plurality of paths having a lowest traffic level and transmitting a second I/O request having the highest urgency level by the path among the plurality of paths having the lowest traffic level.

Another exemplary embodiment includes a method for assigning an urgency level to the first I/O request. This method includes associating the first I/O request with one of a plurality of I/O groups, each I/O group comprising I/O requests sharing a distinguishing characteristic, and identifying a performance target for each I/O group. For example, the performance target may be a maximum delay before sending an I/O request within the I/O group to the data storage subsystem or a minimum number of I/O requests per second sent to the data storage subsystem from the I/O group. These performance targets may also be expressed as a TBU, or time before the I/O request is urgent. The method further includes tracking, for the first I/O request, a metric corresponding to the performance target for the associated I/O group. Where the performance target is a maximum delay, for example, the metric may be the elapsed time since the first I/O request was initiated. The method further includes assigning an urgency level to the first I/O request based on the difference between the performance target and the metric. For example, the highest urgency level may be assigned to the first I/O request when the metric is approximately equal to or greater than the performance target and another urgency level may be assigned to the first I/O request when the metric is less than the performance target. The assigned urgency level may also be increased as the metric approaches the first target.

Yet another exemplary method consistent with the principles of the invention includes identifying, for each of the plurality of paths, a maximum number of pending I/O requests having a first urgency level, wherein the first urgency level does not comprise the highest urgency level. The method further includes tracking the number of pending I/O requests having the first urgency level for each of the plurality of paths and identifying a first set of paths whose number of pending I/O requests having the first urgency level does not exceed its identified maximum number. The method further includes transmitting a first I/O request having a first urgency level by one of the first set of identified paths. Similar methods may be based on identifying and tracking the number of bytes in pending I/O requests or the time between transmitting I/O requests on a path.

One of ordinary skill in the art will appreciate that the methods described herein may be embodied in various components of a computer system with at least one associated data storage subsystem. One of ordinary skill in the art will also appreciate that various limitations and metrics other than those presented herein may be used while remaining consistent with the features and principles of the invention. Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

The inventors of the present invention recognized that division of the capacity of a path between a host and a data storage subsystem among different types of I/O requests could result in better response times for some I/O requests. The inventors further recognized that a host I/O driver could dynamically adjust the division of the capacity for the paths so that a desirable quality of service for I/O requests can be achieved and maintained.

Reference is now made in detail to exemplary embodiments of the invention, examples of which are illustrated in the accompanying drawings.

Figure 1:
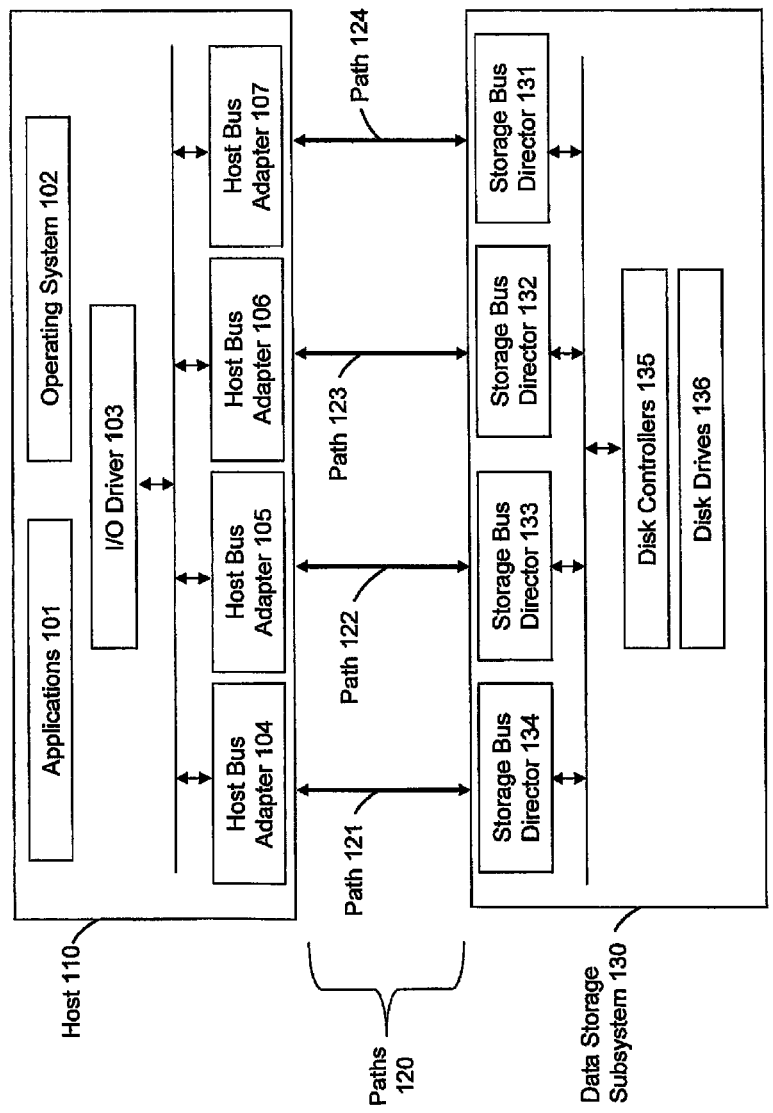
FIG. 1 illustrates an exemplary computer system, consistent with features and principles of the present invention.

A computer system may include multiple hosts and multiple data storage subsystems such each host may access data on each of data storage subsystems. For simplicity, however, FIG. 1 illustrates a computer system 100 that includes a single host 110 and a single data storage subsystem 130. Applications 101 running on operating system 102 of host 110 may access data in data storage subsystem 130 via I/O driver 103 and host bus adapters 104, 105, 106, and 107. Host 110 can be, for example, a server, a personal computer, or any other device capable of initiating read and write requests to data storage subsystem 130. Data storage subsystem 130 can be a single physical data storage device or a data storage system comprising multiple physical data storage devices including an enterprise storage system. For example, data storage subsystem 130 may be a SYMMETRIX data storage system, available from EMC Corporation of Hopkinton, Mass., a CLARIION data storage system available from EMC Corp., a TagmaStore data storage system available from Hitachi Data Systems Corp. of Santa Clara, Calif., or a FAStT data storage system available from IBM. In computer systems consistent with the principles of the invention, there may be a plurality of data storage subsystems 130 accessible by host 110 and each data storage subsystem may be unique.

Host 110 has multiple paths 120 for sending I/O requests to data storage subsystem 130. Typically, there are at least two paths from a host to a data storage subsystem. Generally, there may be up to 32 paths. FIG. 1 shows four paths from host 110 to data storage subsystem 130: path 121, path 122, path 123, and path 124. Each of the paths 120 can be any of a number of different types of communication links that allow data to be passed between data storage subsystem 130 and host 110. Each of the host bus adapters 104, 105, 106, and 107 would be adapted to communicate using an appropriate protocol via the paths 120. For example, path 120 can be implemented as a SCSI bus with host bus adapters 104 and storage bus director 134 each being a SCSI driver. Alternatively, path 120 between the host 110 and the data storage subsystem 130 may be a Fibre Channel fabric. Moreover, a path 120 may include multiple communication path types and may be part of a communication network.

Host 110 contains an operating system 102, applications 101, I/O driver 103, and host bus adapters 104, 105, 106, and 107. I/O driver 103 facilitates the sending of I/O requests from applications 101 running on host 110 to data storage subsystem 130. The I/O driver may queue I/O requests from host 110 directed to data storage subsystem 130. In addition, the I/O driver may implement algorithms to decide which I/O requests to send, how many I/O requests to send, and the speed at which to send I/O requests. The I/O driver may keep a record of I/O requests that are sent to data storage subsystem 130 until the I/O request is processed by data storage subsystem 130. An exemplary host I/O driver is the POWERPATH tool, available from EMC Corp. The POWERPATH tool may use known path selection techniques such as those described in U.S. Pat. No. 6,542,944, entitled "Method And Apparatus For Balancing Workloads Among Paths In A Multi-Path Computer System Based On The State Of Previous I/O Operations" and issued on Apr. 1, 2003 to EMC Corp.

Figure 2:
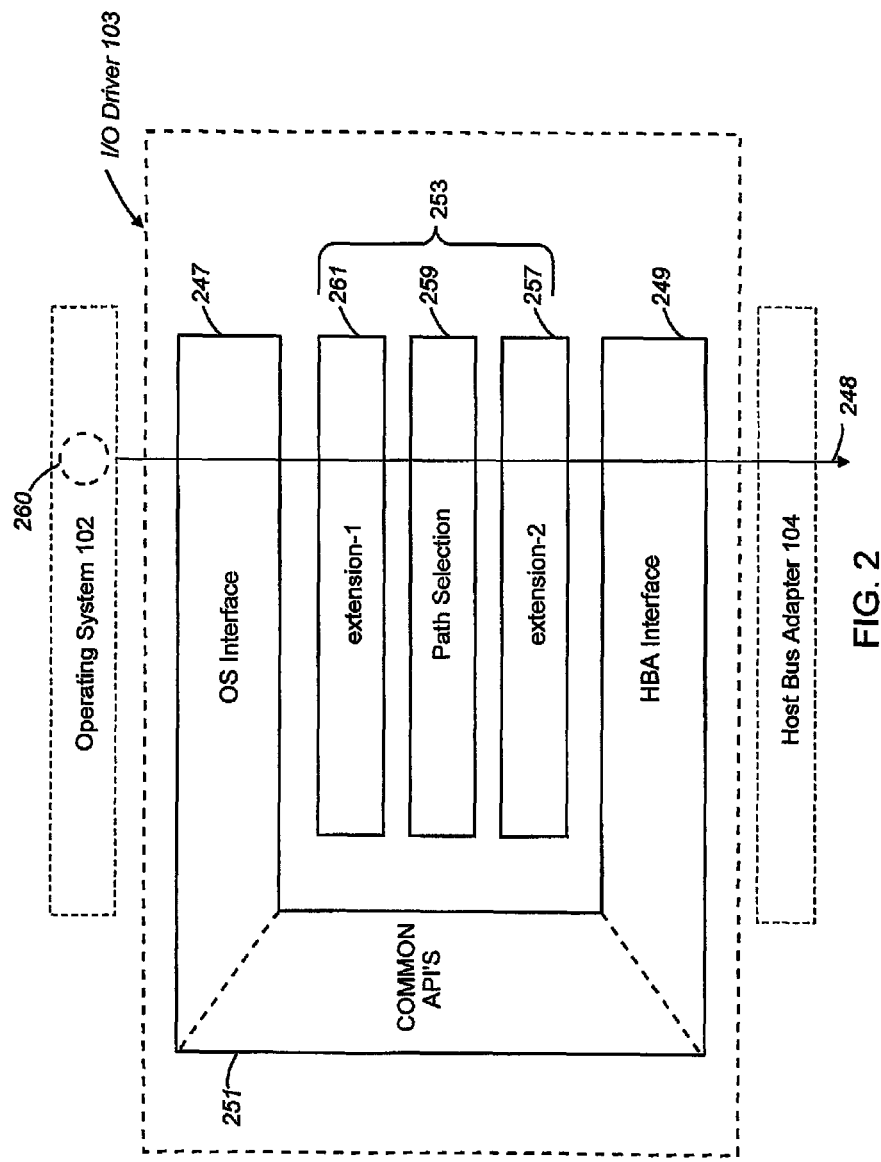
FIG. 2 illustrates portions of an exemplary host including an I/O driver, consistent with features and principles of the present invention.
Figure 3:
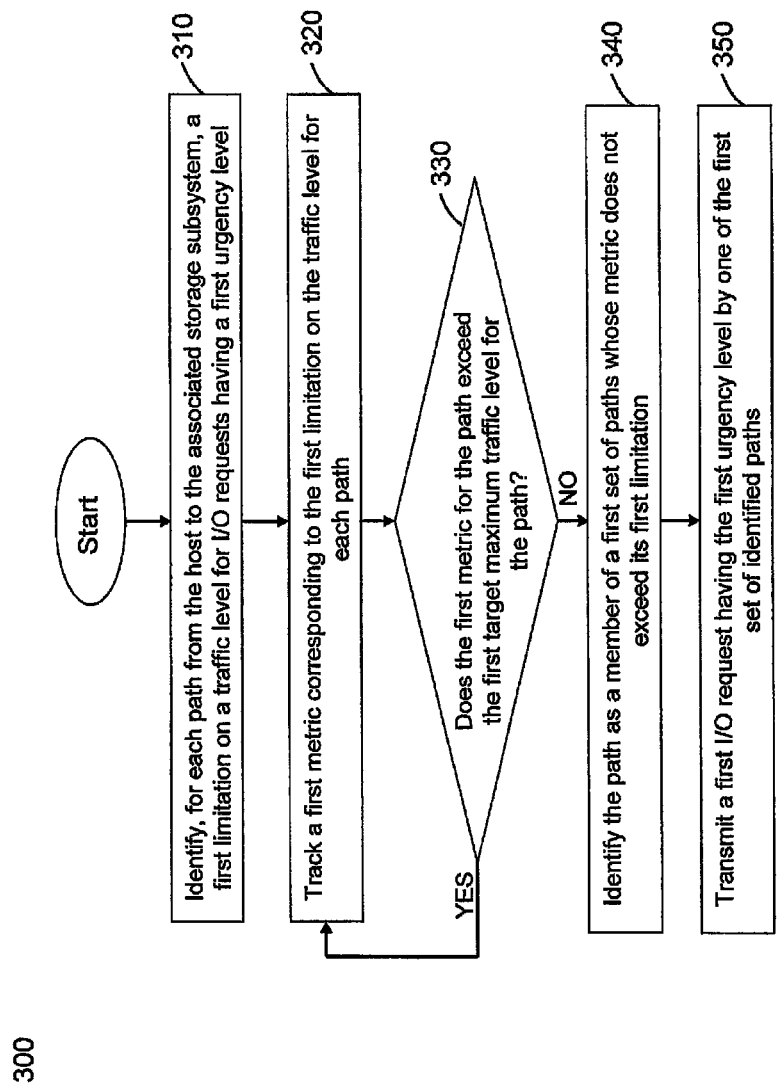
FIG. 3 illustrates an exemplary method for selecting a path by which to send an I/O request from a host to an associated storage subsystem from among a plurality of paths from the host to the associated storage subsystem, consistent with features and principles of the present invention.

FIG. 2 illustrates portions of an exemplary host including an I/O driver, consistent with features and principles of the present invention. Although I/O driver 103 only interacts with an operating system 102, I/O driver 103 can conceptually be considered to be placed between operating system 102 and at least one host bus adapter 104. I/O requests, such as I/O request 260, are passed from the operating system 102 to the I/O driver through the OS interface 247.

I/O driver 103 of FIG. 2 may be thought of conceptually as having the form of a "C" clamp with a top horizontal arm 247, a bottom horizontal arm 249, and a vertical connector 251 between the arms. Horizontal arm 247 may be, for example, an interface to any operating system (OS) such as LINUX, Sun's SOLARIS, IBM's AIX, HP's HPUX, and Microsoft's WINDOWS NT. Bottom horizontal arm 249 includes platform-dependent code comprising an interface to relevant host bus adapters 104, 105, 106, and 107. Only host bus adapter 104 is shown for exemplary purposes. Vertical connector 251 comprises a series of common Application Programming Interfaces (APIs). An advantage of the C clamp is that extensions can be written in a platform-independent manner because the arms 247, 249 translate all of the platform-dependent communications into more generic communications. An extension stack 253 is enveloped between arms 247 and 249. In addition to a plurality of existing extensions 261, 257 in extension stack 253, a path selection extension 259 is added to perform the logical division of path capacity. Path selection extension 259 can consist of a plurality of extensions.

The I/O driver, via path extension 259, may select a path by which to transmit an I/O request or group of I/O requests to data storage subsystem 130. I/O driver 103 would communicate with the appropriate host bus adapter 104, 105, 106, or 107 depending on which path is selected.

Users may designate priority levels for I/O requests based on the desired response time for a group of I/O requests sharing a distinguishing characteristic. Users may designate as the highest priority, I/O requests for which the fastest response time is desirable. The I/O driver may immediately identify I/O requests within high priority groups as urgent. Since I/O requests identified as urgent requests are requests for which the fastest response time is desirable, these requests generally should be sent immediately to the data storage subsystem and not remain in a queue on the host whenever possible. For this reason, urgent requests are generally sent on the path that will result in the shortest response time. For example, an urgent request may be sent on the path that has the shortest queue of pending I/O requests. An example of a high priority request that may be treated as urgent request is a re-do log write in a database application. Another example of an urgent request is a read I/O request.

A user may designate other I/O requests within other groups as lower priority, thereby allowing a slower response time. The I/O driver may identify these I/O requests as non-urgent requests. A path may be selected for sending non-urgent I/O requests to a data storage subsystem using methods consistent with principles and features of the invention. Non-urgent requests may also be ordered in a queue on the host by relative urgency using methods consistent with the principles and features of the invention. Using methods consistent with the principles and features of the present invention, a non-urgent request may become urgent after some time has elapsed in order to meet a performance target. Additionally, there may be various levels of urgency associated with non-urgent requests. The levels of urgency may be based on user specifications or system defined policies for high and low priority I/O requests. An example of a non-urgent request is a data write request in a database application.

FIG. 2 illustrates a method 300 for selecting a path by which to send an I/O request from a host to an associated data storage subsystem from among a plurality of such paths. Method 300 may be used, for example, to select which path among paths 121, 122, 123, 124 by which to send a non-urgent I/O request from host 110 to data storage subsystem 130. Method 300 may be implemented in computer system 100, for example, as a path selection extension 259, or as part of another extension, in I/O driver 103 on host 110. Alternatively, method 300 may be implemented in computer system 100 as an application running on host 110 separate from the I/O driver.

At stage 310 of method 300, a first limitation on a traffic level for I/O requests having a first urgency level is identified for each path from the host to the associated storage subsystem. The limitation on a traffic level of a path represents a level beyond which the transmission via the path of I/O requests having the first urgency level is blocked. Therefore, by identifying the limitation on the traffic level for a path as zero, one may effectively dedicate the path for sending only urgent I/O requests.

The limitation on the traffic level may be any number of measures including a maximum number of pending I/O requests, a maximum number of bytes in pending I/O, or a time between transmissions of I/O requests having the first urgency level along the path. For example, the limitation on a traffic level corresponding to paths 121, 122, 123, and 124 may be 100, 20, 10, and 5 pending I/O requests respectively. These limits may be of pending I/O requests of the first urgency level or alternatively, the limits may be of pending I/O requests of any urgency level or a subset of urgency levels.

One embodiment of method 300 includes only two urgency levels: urgent and non-urgent. In this embodiment, urgent I/O requests are the highest urgency level. Other embodiments may include more than two urgency levels below the highest urgency level. Where there are multiple urgency levels, each path may have a different limitation on the traffic level for each of the possible lower urgency levels. For example, if two lower urgency levels were defined, path 121 may have a limit of 100 pending I/O requests for the first non-urgent level, and a limit of 120 pending I/O requests for the second lower urgency level. An I/O request having the first lower urgency level would not be sent on path 121 when there are 100 or more pending I/O requests. An I/O request having the second lower urgency level would not be sent on path 121 when there are more than 120 pending I/O requests.

The traffic level limitations for each path and for various urgency levels may also be different types of limitations. For example, path 121 may have a limit of the 100 pending I/O requests for a first lower urgency level and a limit of 100 MB of pending I/O requests for a second lower urgency level. Similarly, the limitation on the traffic levels for each path may be different types of limitations.

In addition, the limitation on the traffic level for each path may be adjusted periodically or in response to thresholds for I/O request response times set in the system, to maintain a desired quality of service. For example, a threshold queue length in the I/O driver for non-urgent requests may be set, and the maximum traffic level may be increased when the queue length in the I/O driver exceeds the threshold.

At stage 320 of method 300, a metric corresponding to the first limitation on the traffic level for each path is tracked. For the example, if the first limitation on the traffic level for path 121 is 100 pending I/O requests, the first metric tracked in stage 320 for path 121 would be the actual number of pending I/O requests on path 121. For another example, if the first limitation on the traffic level for path 121 is 1 GB in the pending I/O requests, the first metric tracked in stage 320 for path 121 would be the actual number of bytes in all pending I/O requests on path 121. Where the first limitation on the traffic level for path 121 comprises a time between transmissions of I/O requests having a first urgency level along the path, the first metric tracked in stage 320 for path 121 could be the elapsed time since the last transmission of an I/O request having the first urgency level on the path.

At stage 330, the first limitation on the traffic level is compared with the first metric for the path. At stage 340, a set of paths is identified where each path's first metric does not exceed its first limitation. One of the identified paths may be selected for transmission of an I/O request having the first urgency level at stage 350. If more than one path has a first metric that does not exceed its first limitation on the traffic level, one of those paths is selected by applying an additional selection criterion. The additional selection criterion may be the paths with the lowest traffic level. Alternatively, the additional selection criterion may be the next path in a round robin queue, may be the path with lowest or highest identifier, or may be the path whose first metric is farthest from its the target maximum. A path whose first metric exceeds its first limitation on the traffic level may not be selected for transmission of an I/O request having the first urgency level at stage 350.

Table 1 below provides information representing exemplary results of method 300 at a point of time for paths 121, 122, 123, and 124 where the limitation on the traffic level is identified as a number of pending I/O requests. In the example described by Table 1, stage 350 of method 300 may involve transmission of an I/O request having the first urgency level via path 121 or path 122. Paths 121 and 122 would comprise the first set of paths identified in stage 340. Where the lowest traffic level is the additional selection criterion, stage 350 involves transmission of an I/O request having the first urgency level via path 122. Where the lowest path identifier is the additional selection criterion, stage 350 involves transmission of an I/O request having the first urgency level via path 121.

TABLE 1

Exemplary Results using method 300

| Path | Limit (# of pending I/O requests) | Actual (# of pending I/O requests) | Actual exceeds Limit? |
|---|---|---|---|
| Path 121 | 100 | 35 | No |
| Path 122 | 20 | 19 | No |
| Path 123 | 10 | 11 | Yes |
| Path 124 | 5 | 7 | Yes |

Generally, if the first metric exceeds the first limitation on the traffic level for all paths to the data storage subsystem, the I/O requests having the first urgency level may be queued on the host until a path meets the criteria for selection. The I/O driver may receive an acknowledgement from storage subsystem 130 that an I/O request has terminated (i.e. the I/O request has been processed by data storage subsystem 130 and is no longer pending on a path). Once this acknowledgement is received, the I/O driver can move to another I/O request in the queue, again performing method 300 to select a path for sending the I/O request to the data storage subsystem.

The urgency level may be assigned according to methods described herein or according to some other method. In addition, the urgency level of I/O requests may change over time. Where the urgency level has changed, the I/O request may then be subject to different limitations based on limitation set for the new urgency level. After some time has elapsed, an I/O request initially having one urgency level may be assigned a higher urgency level. A policy may be set where I/O requests of the highest urgency level (urgent I/O requests) are sent on the path with the lowest traffic level. In the foregoing example, urgent requests could be sent on path 124, which is the path with the lowest traffic level metric. Other policies may be set for selecting a path by which to send an urgent I/O request to ensure that urgent I/O requests are sent along the path that will result in the fastest response time.

Traffic level limitations for each path may be identified by a user or by software designed to maintain quality of service. In addition to the overall performance requirements for the I/O requests in the computer system, the speed, bandwidth, communication protocol, and other features of each path may be considered in setting the limitation on the traffic level. Since typically the selection of a path implies the selection of particular port and I/O processing CPU in the front end of a data storage system, limitations of these types of resources may also be considered in setting the limitations for each path.

In the examples herein, one limitation on the traffic level is identified for each path. However, it should be noted that multiple limitations on the traffic levels could be identified for each path. For example, the first limitation on the traffic level for path 121 may be 100 pending I/O requests and a second limitation on the traffic level for path 121 may be 1 GB of pending I/O requests. In this case, two metrics would be tracked in stage 320. In the foregoing example, the first metric tracked would be the actual number of pending I/O requests, and the second metric tracked would be the total number of bytes in the pending I/O requests on path 121. In selecting a path where there is more than one limitation identified, none of the limitations on traffic levels should be exceeded by its corresponding metric. Continuing with the foregoing example, if there were 50 pending I/O requests on path 121 that aggregated to 2 GB of data, path 121 would not be selected for sending a non-urgent I/O request. Where there are multiple urgency levels, multiple limitations could also be identified for each of the multiple urgency levels. Additional constraints, in addition to limitations traffic levels, could be added to the selection of paths including designating certain paths for specific types of I/O requests.

Figure 4:
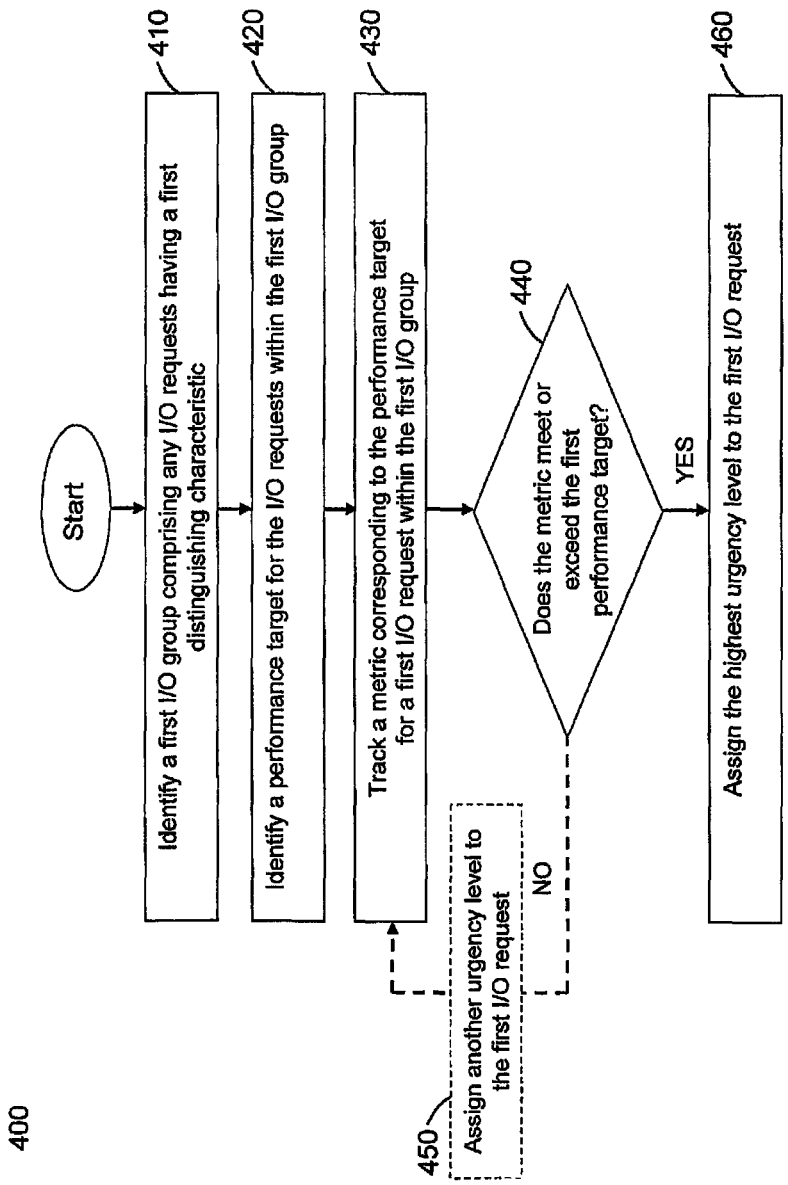
FIG. 4 illustrates an exemplary method for assigning an urgency level to an I/O request, consistent with features and principles of the present invention.

FIG. 4 illustrates exemplary method 400 for assigning an urgency level to an I/O request to be sent from a host to a data storage subsystem. Method 400 may be implemented, for example, as a path selection extension 259 in I/O driver 103 to identify the next I/O request to send from host 110 to data storage subsystem 130 via paths 120, where the path may be selected by method 300 or by some other method.

In stage 410, a first I/O group comprising any I/O requests that share one or more distinguishing characteristics is identified. Each I/O request may be associated with an I/O group. The I/O group is a group of I/O requests that share characteristics that enable the I/O driver to distinguish between the groups. For example, an I/O group may be I/O requests directed to a particular LUN or I/O requests initiated from a particular application running on the host. Alternatively, an I/O group could be I/O requests of a particular type such as a read request, write request, synchronous request, asynchronous request, I/O size, or some other distinguishing characteristic. The I/O group may be identified, for example, by the user or by the application sending the I/O request.

In stage 420, a performance target for the first I/O group is identified and in stage 430, a metric corresponding to the performance target is tracked for a first I/O request that is within the first I/O group. The performance target may be identified based on the priority that the user or software has assigned to a particular I/O group. The performance target may be, for example, a maximum allowable delay before an I/O request should be sent to an associated storage subsystem. Another example of a performance target is a number of I/O requests per second sent to an associated storage subsystem.

In stage 440, the performance target is compared with the metric for the first I/O request. If the metric of the first I/O request meets or exceeds the performance target, in stage 460 the first I/O request is assigned the highest urgency level. For example, where an I/O group is all data I/O requests from a certain database application and the performance target for this group is 100 I/O's sent per second, the I/O driver may track the time since sending the last I/O request from the database application. If 10 ms has elapsed since a data I/O request from the database application has been sent, the next I/O request from this group would be assigned the highest urgency level. To enforce the target, this urgent I/O request may be sent immediately on the path with the lowest traffic level, or it may be the next I/O sent on a path selected using another method. If the metric of the first I/O request is less than the performance target, at optional stage 450, the first I/O request may be assigned another urgency level that is not the highest urgency level. Alternatively, the assigned urgency level may remain the same, and I/O driver may return to stage 430 and continue to track the metric. If another urgency level is assigned in optional stage 450, the method may then return to stage 430 and continue to track the metric.

In another example implementing method 400, the performance target may be a maximum delay for I/O requests within the I/O group. For example, an I/O group may have a target delay of one second so that if more than one second has elapsed since the first I/O was generated, the highest urgency level would be assigned to the first I/O request.

In yet another example, the maximum delay may be set to zero for I/O requests within an I/O group. The effect of setting a maximum delay to zero is that I/O requests belonging to that group will always be at the top of the queue of I/O requests to be sent to the data storage subsystem or may be sent immediately on the fastest path depending on the policy employed for urgent requests.

At stage 450, all I/O requests whose metric is less than the performance target may be assigned a single urgency level such that only two urgency levels are possible for any I/O request—i.e. the highest urgency level or the lower urgency level. Alternatively, I/O requests whose metric is less than the performance target may be assigned one of any number of urgency levels based on the difference between the metric and the performance target. For example, where the performance target is 100 I/O's sent per second, a first urgency level may be assigned where between less than 5 ms has elapsed and a second urgency level may be assigned where between 5 ms and 10 ms has elapsed.

For I/O requests having an urgency level that is not the highest urgency level, the method may continue to track the metric in stage 430 and compare with the performance target in stage 440. While the urgency level is other than the highest urgency level, method 300 may be performed to select a path for sending I/O requests having other than the highest urgency level.

When an I/O request cannot be sent by any path, it may be queued on the host. By identifying and tracking performance metrics for I/O groups, the I/O driver can create a prioritized queue on the host of I/O requests that will facilitate meeting performance targets. Since each request has an assigned urgency level, the I/O requests may be ordered in the queue according to their urgency level. The I/O requests may also be ordered in the queue such that the top of the queue contains the I/O requests where the difference between the performance target and the metric is the smallest. In effect, this will order the queue based on the relative time before each I/O request reaches the highest urgency level. The queue may be reordered periodically. Alternatively, the queue may be reordered each time the urgency level of any queued I/O request changes or each time an I/O request is processed by the data storage subsystem. In addition, performance targets for I/O groups may be adjusted periodically or in response to a performance requirement or metric that is not being met. Multiple targets could also be set, tracked, and enforced for an I/O group.

In another exemplary embodiment, each I/O request is associated with an I/O group and is assigned a TBU, or a time before it becomes urgent, as it's performance target when it arrives at the I/O driver. The TBU is the time that may elapse before the I/O request reaches the highest urgency level. The TBU may be based on a maximum delay for I/O requests in the I/O group so that each I/O within the I/O group is assigned a TBU equal to the maximum delay. Alternatively, the TBU may be based on a target number of I/O's per second sent to the data storage subsystem from an I/O group. In this case, the TBU would initially be equal to the inverse of the target number and adjusted based on the time that has elapsed since the last I/O request from the group was transmitted. For example, if the target is 100 I/O's per second for I/O requests within group A and 5 ms had elapsed since an I/O request within group A was transmitted, the TBU would be 5 ms to meet the 10 ms target.

In the foregoing exemplary embodiment, a timer may be used to track how much time has elapsed and whether the TBU has been exceeded for each I/O request. When the time elapsed is equal to the TBU, the I/O request may be assigned the highest urgency level. Alternatively, a timer may be incremented from zero up to the TBU or decremented from the TBU to zero so that the I/O request is automatically assigned the highest urgency level when the timer reaches the TBU or zero respectively.

Still alternatively, a time-stamp may be given to each I/O request upon arriving at the I/O driver representing the time by which the I/O request should be sent to the data storage subsystem. The time-stamp corresponds to the TBU, where the time-stamp is the time that the I/O request would reach the highest urgency level. For example, where the performance target for the I/O group with which the I/O request is associated is a maximum delay, the time-stamp assigned to the incoming I/O request would be the current time plus the maximum delay. Where the performance target is a minimum number of I/O's per second that should be sent from the associated I/O group, a time-stamp may be assigned that is the inverse of the minimum number and may be adjusted based on the time that the last I/O within the group was transmitted. For example, if the incoming I/O request is associated with an I/O group having a target minimum of 100 I/O's per second sent to the data storage subsystem, then a time-stamp equivalent to 10 ms from the last time an I/O from that group was sent may be assigned to the incoming I/O request. By performing this method for each of the incoming I/O requests, the I/O driver can order the I/O requests in a queue based on the time-stamps, which represent the time that they should be sent to the data storage subsystem.

In the foregoing example, some I/O groups may be associated with high priority I/O requests and these requests may be assigned a TBU of zero so that they are immediately designated the highest urgency level. One policy may be to send these urgent requests to the data storage subsystem immediately along the fastest path.

The methods disclosed herein are especially useful in computer systems utilizing an enterprise storage system, however, one of ordinary skill in the art will appreciate that the features and principles of the present invention may be implemented in various computer systems. One of ordinary skill in the art will also appreciate that features and principles of the present invention may be implemented in different components of a computer system with at least one associated data storage subsystem. Similarly, one of ordinary skill in the art will also appreciate that computer readable program code to implement a method consistent with features and principles of the present invention may be stored on various media, including various persistent memory devices.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method comprising:
    selecting a path by which to send an I/O request from a host to an associated storage subsystem from among a plurality of paths from the host to the associated storage subsystem, the selecting comprising:
        identifying, for each of the plurality of paths, a first limitation on a traffic level for I/O requests having a first urgency level, wherein the first urgency level does not comprise the highest urgency level;
        tracking a first metric corresponding to the first limitation for each of the plurality of paths;
        identifying a first set of paths whose first metric does not exceed its first limitation; and
        transmitting a first I/O request having the first urgency level by one of the first set of identified paths;
        identifying, for each of the plurality of paths, a second limitation on the traffic level for I/O requests having a second urgency level, wherein the second urgency level does not comprise the highest urgency level;
        tracking a second metric corresponding to the second limitation for each of the plurality of paths;
        identifying a second set of paths whose second metric does not exceed its second limitation; and
        transmitting a second I/O request having the second urgency level by one of the second set of identified paths.

2. The method of claim 1, further comprising transmitting the first I/O request by one of the first set of identified paths having the lowest traffic level among the plurality of paths.

3. The method of claim 1, wherein the limitation on the traffic level comprises a number of pending I/O requests.

4. The method of claim 1, wherein the first limitation on the traffic level comprises a number of bytes in pending I/O requests.

5. The method of claim 1, wherein the first limitation on the traffic level comprises a time between transmissions of I/O requests corresponding to the first urgency level along the path.

6. The method of claim 1, further comprising:
    identifying, for each of the plurality of paths, a second limitation on the traffic level for I/O requests corresponding to the first urgency level;
    tracking a second metric corresponding to the second limitation for each of the plurality of paths; and
    transmitting a first I/O request having the first urgency level by one of identified paths, wherein the first set of paths comprises paths whose second metric does not exceed its second limitation.

7. The method of claim 6, wherein the first limitation and the second limitation are selected from the group consisting of a number of pending I/O requests, a number of bytes in pending I/O requests, and a time between sending non-urgent I/O requests.

8. The method of claim 1, further comprising queuing I/O requests having a first urgency level on the host when the first metric for each path exceeds its first limitation.

9. The method of claim 1, wherein the distinguishing characteristic is selected from the group consisting of an I/O type, an I/O size, a host application initiating the I/O request, and a logical unit to which the I/O request is directed.

10. The method of claim 1, wherein the performance target is a maximum allowable delay before the I/O request is sent to an associated storage subsystem.

11. The method of claim 1, wherein the performance target is a minimum number of I/O requests per second sent to an associated storage subsystem.

12. An apparatus comprising:
    circuitry to select a path by which to send an I/O request from a host to an associated storage subsystem from among a plurality of paths from the host to the associated storage subsystem comprising circuitry to:
        identify, for each of the plurality of paths, a first limitation on a traffic level for I/O requests having a first urgency level, wherein the first urgency level does not comprise the highest urgency level;
        track a first metric corresponding to the first limitation for each of the plurality of paths;
        identify a first set of paths whose first metric does not exceed its first limitation; and
        transmit a first I/O request having the first urgency level by one of the first set of identified paths;
        identify, for each of the plurality of paths, a second limitation on the traffic level for I/O requests having a second urgency level, wherein the second urgency level does not comprise the highest urgency level;
        track a second metric corresponding to the second limitation for each of the plurality of paths;
        identify a second set of paths whose second metric does not exceed its second limitation; and
        transmit a second I/O request having the second urgency level by one of the second set of identified paths.

13. The apparatus of claim 12 wherein the circuitry to select a path comprises at least one of a processor, a memory, programmable logic and logic gates.

14. An article comprising:
    a non-transitory machine-readable medium that stores executable instructions, the instructions cause a machine to select a path by which to send an I/O request from a host to an associated storage subsystem from among a plurality of paths from the host to the associated storage subsystem, the instructions comprising instructions to:
        identify, for each of the plurality of paths, a first limitation on a traffic level for I/O requests having a first urgency level, wherein the first urgency level does not comprise the highest urgency level;
        track a first metric corresponding to the first limitation for each of the plurality of paths;
        identify a first set of paths whose first metric does not exceed its first limitation; and transmit a first I/O request having the first urgency level by one of the first set of identified paths;

identify, for each of the plurality of paths, a second limitation on the traffic level for I/O requests having a second urgency level, wherein the second urgency level does not comprise the highest urgency level;

track a second metric corresponding to the second limitation for each of the plurality of paths;

identify a second set of paths whose second metric does not exceed its second limitation; and transmit a second I/O request having the second urgency level by one of the second set of identified paths.

15. The apparatus of claim 12, further comprising circuitry to transmit the first I/O request by one of the first set of identified paths having the lowest traffic level among the plurality of paths.

16. The apparatus of claim 12, wherein the limitation on the traffic level comprises a number of pending I/O requests.

17. The apparatus of claim 12, wherein the first limitation on the traffic level comprises a number of bytes in pending I/O requests.

18. The article of claim 14, further comprising instructions that cause the machine to transmit the first I/O request by one of the first set of identified paths having the lowest traffic level among the plurality of paths.

19. The article of claim 14, wherein the limitation on the traffic level comprises a number of pending I/O requests.

20. The article of claim 14, wherein the first limitation on the traffic level comprises a number of bytes in pending I/O requests.

* * * * *